US010049247B2

(12) United States Patent
Gao

(10) Patent No.: US 10,049,247 B2
(45) Date of Patent: Aug. 14, 2018

(54) OPTIMIZATION OF IMAGE FRAME MANAGEMENT IN A SWEEP-STYLE OPTICAL CODE DATA READER

(71) Applicant: Datalogic USA, Inc., Eugene, OR (US)

(72) Inventor: WenLiang Gao, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 15/292,037

(22) Filed: Oct. 12, 2016

(65) Prior Publication Data
US 2018/0101708 A1 Apr. 12, 2018

(51) Int. Cl.
*G06K 19/00* (2006.01)
*G06K 7/10* (2006.01)

(52) U.S. Cl.
CPC ..... *G06K 7/10831* (2013.01); *G06K 7/10742* (2013.01); *G06K 7/10811* (2013.01)

(58) Field of Classification Search
USPC ................. 235/435, 439, 454, 462
See application file for complete search history.

(56) References Cited

U.S. PATENT DOCUMENTS

| 6,247,646 | B1* | 6/2001 | Iwaguchi ................. G06K 7/14 235/462.04 |
| 6,296,187 | B1* | 10/2001 | Shearer .............. G06K 7/10722 235/462.1 |
| RE40,071 | E | 2/2008 | Svetal et al. |
| 7,331,523 | B2 | 2/2008 | Meier et al. |
| 7,845,561 | B2 | 12/2010 | Kotlarsky et al. |
| 7,874,485 | B2 | 1/2011 | Meier et al. |
| 8,628,015 | B2 | 1/2014 | Wang et al. |
| 8,736,716 | B2 | 5/2014 | Prentice |
| 2010/0177363 | A1* | 7/2010 | Zhou ........................ G06K 7/14 358/474 |

* cited by examiner

*Primary Examiner* — Matthew Mikels
(74) *Attorney, Agent, or Firm* — Stoel Rives LLP; Robert R. Teel

(57) ABSTRACT

Disclosed are techniques to enhance an in-counter sweep-style data reader, having frame buffer memory and an imager defining a read zone, so as to improve a likelihood of decoding an optical code appearing in initial image frames by managing utilization of the frame buffer memory according to a prioritization of different categories of image frames captured by the imager as an object bearing an optical code is passed through the read zone.

16 Claims, 5 Drawing Sheets

OPTIMIZATION OF IMAGE FRAME MANAGEMENT IN A SWEEP-STYLE OPTICAL CODE DATA READER

TECHNICAL FIELD

The field of the present disclosure relates generally to imager-based optical code data readers and, more particularly, to techniques for managing frame buffer memory and related resources of a data reader.

BACKGROUND INFORMATION

Conventional imager-based optical code data readers (or simply, data readers) do not differentiate which image frame(s), among a sequence of image frames, should be obtained or otherwise preserved in frame buffer memory. In other words, the conventional data readers do not attempt to prioritize certain image frames over others and instead treat each image frame (also called an image or a frame) equally. This has the effect of allocating resources—such as, for example, decoder processor dwelling time, frame buffer memory utilization, and frame rate—equally for each image frame obtained throughout a sweep of an object, i.e., an item of merchandise, through a read zone of the data reader.

SUMMARY OF THE DISCLOSURE

This disclosure describes techniques for enhancing sweep-style data readers to include capabilities of handling different image frames according to different priorities and associated timing parameters. For example, managing frame buffer memory may entail determining an oldest stored image frame and comparing priorities of new and stored image frames to determine whether to replace any stored image frames with the new one. In another example optimization—which may be deployed separately from or in addition to other optimizations—techniques for allocating more decoder processing dwelling time on the most promising image frames (i.e., image frames having a high possibility of including a visual representation of an optical code) are also described. And in another example optimization—which again may be deployed separately from or in addition to other optimizations—a data reader may be initially configured to capture a higher number of image frames, i.e., run at a higher frame rate (or retain in frame buffer memory for a longer duration the most promising image frames) so that an optical code is more likely to appear in the stored image frames obtained, e.g., during initial moments of a sweep through the read zone.

Systems and methods are described in connection with an in-counter sweep-style data reader having frame buffer memory and an imager defining a read zone. The systems and methods provide for increasing a likelihood of decoding an optical code appearing in initial image frames by managing utilization of the frame buffer memory according to a prioritization scheme for different categories of image frames captured by the imager as an object bearing an optical code is passed through the read zone. The disclosed systems and methods include detecting the object entering the read zone; in response to detecting the object, capturing a predefined number of sweep frames followed by one or more presentation frames, the sweep frames defining a first category of image frames having a first priority and the one or more presentation frames defining a second category of image frames having a second priority that is lower than the first priority; and storing captured image frames in the frame buffer memory based on priorities and storage times of stored frames such that, in response to the frame buffer memory being full, a newest sweep frame replaces a stored frame of either the first or second categories and a newest presentation frame is skipped when the stored frames are of the first category.

Some advantages of such approaches are faster decoding and increased likelihood of successfully decoding an optical code appearing during the initial moments (i.e., initial image frames) of a single sweep though the read zone. Additional aspects and advantages will be apparent from the following detailed description of embodiments, which proceeds with reference to the accompanying drawings.

BRIEF DESCRIPTION OF THE DRAWING FIGURES

DETAILED DESCRIPTION OF EMBODIMENTS

Current techniques for data reader resource allocation (e.g., decoder processing dwelling time, frame buffer memory management, and frame rate) are not optimal. For efficient use of an imager-based optical code data reader, it is desirable to maximize a first-pass read rate by increasing the likelihood that an object bearing an optical code will have its optical code successfully read on a single data-reading sweep across a read zone. The present disclosure, therefore, describes various techniques for determining how much time to spend on an image frame in a sequence, and for determining which frames should be allocated more time in attempting to read an optical code.

A data reader of the present disclosure differentiates between different types of frames, e.g., based on a configurable fixed amount of frames after an object is detected in a read zone (triggered by object detection). Initial frames, also called sweep frames, or so-called Type 1 frames, are given priority in some embodiments. After that, subsequently obtained frames are treated as presentation frames, or so-called Type 2 frames, during which a user passing the object through the read zone is more likely to hold the object (present or re-present it) in the read zone for a longer duration. The phrase "presentation frame" is used simply to differentiate it from the phrase "sweep frame," but skilled persons will recognize that these two phrases simply mean that sweep frames are an initial set of available frames whereas the presentation frames are simply the subsequent set of available frames.

To avoid delays, resources are allocated toward the Type 1 image frames. Resource allocation may include replacing in frame buffer memory certain older or lower-priority image frames with newer or higher-priority image frames, changing frame rate, changing decoder processing dwelling time, or combinations of these things. (As an aside, the word "or" is used in the non-exclusive sense in this disclosure, which is to say that "A or B" includes A and B as alternatives as well as A and B as a combination.)

Figure 1:
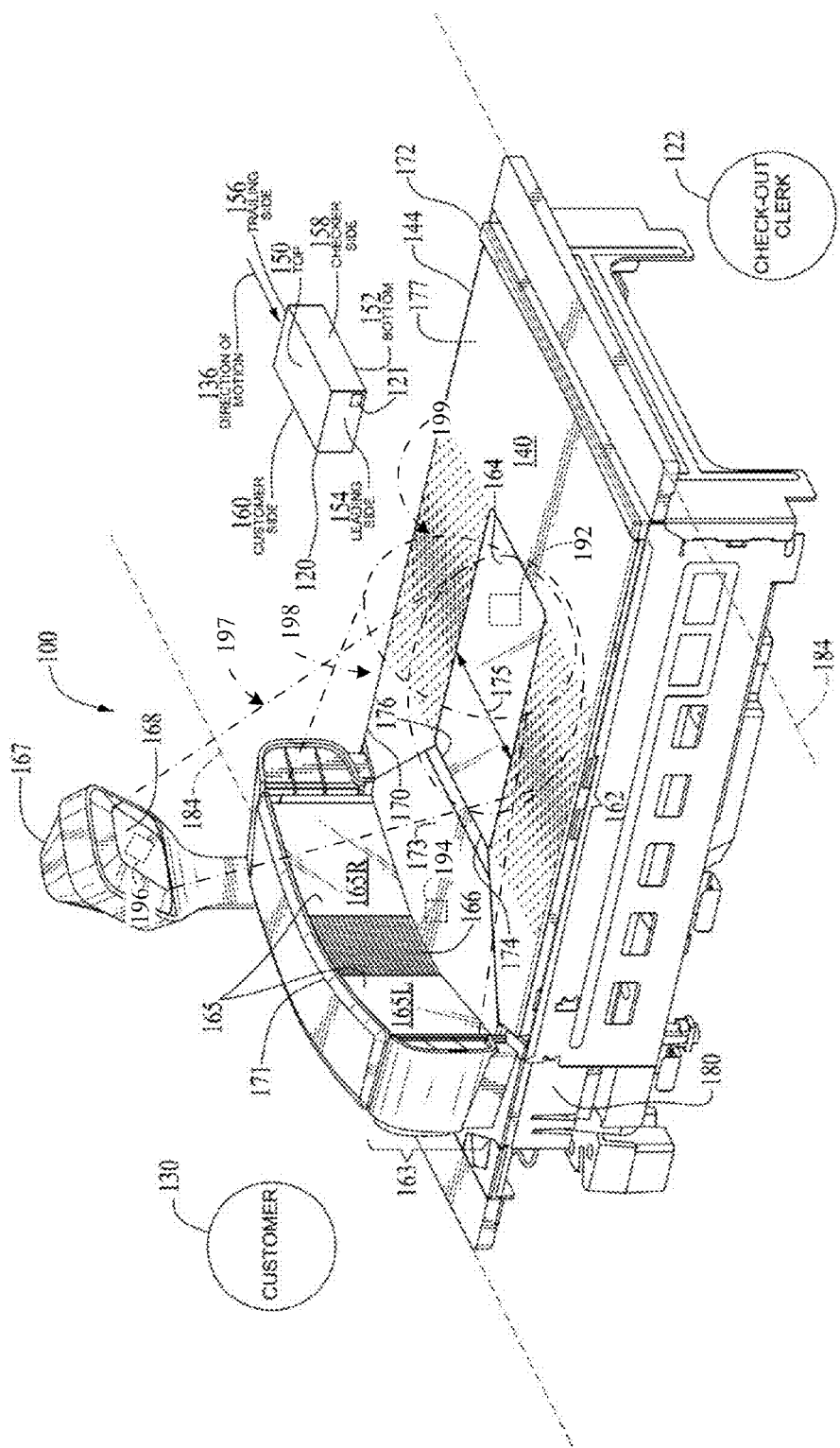
FIG. 1 is an isometric view of an in-counter sweep-style optical code data reader having imagers defining a bi-optic read zone for imaging multiple sides of an object passed through a read zone of the data reader.

FIG. 1 illustrates a data reader 100 and an object 120 with an optical code 121 that may be read by the data reader 100. For purposes of discussion, sides of the data reader 100 are referred to by corresponding locations of a checkout clerk 122, a customer 130, and a direction of motion 136 of the object 120. The object 120 is represented by a rectangular-shaped six-sided polyhedron, such as a cereal box (hereinafter referred to as a box-shaped object, package, or object). Furthermore, sides of the object 120 may be described with respect to direction of motion 136 over a surface 140 of a cover or platter 144 of the data reader 100. For example, the object 120 has a top side 150, a bottom side 152, and four lateral sides 154, 156, 158, and 160. The lateral sides include the leading side 154, i.e., the side leading the object 120 as it is passed through a read zone (described below), the trailing side 156 opposite the leading side 154, the checker side 158 (due to its proximity to the checkout clerk 122), and the customer side 160 (due to its proximity to the customer 130).

The locations of the checkout clerk 122 and the customer 130 are indicated to facilitate explanation and establish a relative frame of reference, but they are not intended as limiting the present disclosure. The data reader 100 is usable without the checkout clerk 122 or the customer 130, and either person can use the data reader 100 from any unobstructed location. In addition, the object 120 is described as a box-shaped package for ease of description, but the object 120 may have other shapes including cylindrical cans, fruit and other produce, or irregularly shaped packages, such as a bag of oranges, potato chips, or the like. Furthermore, the direction of motion 136 of the object 120 is illustrated as right-to-left (from the perspective of the checkout clerk 122), but other directions through a read zone (e.g., left-to-right) are equally applicable.

The data reader 100 includes a substantially horizontal section 162 and a substantially vertical section 163. The sections 162, 163 are disposed substantially orthogonal to each other, with the horizontal section 162 having a horizontal platter window 164 and the vertical section 163 having a split vertical window 165. From the perspective of the checkout clerk 122, the split vertical window 165 includes a left window 165L and a right window 165R. The left and right windows 165L, 165R are separated by a centrally located speaker grille 166.

The data reader 100 includes a top-down reader 167 that houses a downward-facing window 168 and an artificial illumination source that directs illumination out through the window 168.

The platter 144 includes both a lower platter section 170 and an upper platter section 171. The lower platter section 170 encompasses the horizontal platter window 164, which is disposed in a recessed position and preferably mounted flush with the surface 140 of the lower platter section 170.

The platter 144 may include an optional bump, rail, or raised section 172 at one end to inhibit objects 120 (e.g., spherical fruit) from rolling or sliding off the surface 140. At the other end of the platter 144, located between the speaker grille 166 and the horizontal platter window 164, the platter 144 has a wedge-shaped platter section 173 made of plastic or other suitable material. The section 173 extends horizontally away from the split vertical window 165, tapering until its narrowest side 174 is coextensive with a length 175 of the horizontal platter window 164. The narrowest side 174 of the section 173 abuts a customer side 176 of the horizontal platter window 164. The section 173 wedges into a U-shaped portion 177 of the platter 144 to form the generally horizontal surface 140 of the lower platter section 170. The U-shaped portion 177 is commonly constructed of smooth or brushed stainless steel, but may also be constructed from plastic; sheet metals such as aluminum; or other materials, including ceramics.

The upper platter section 171 is located atop the vertical section 163, vertically displaced at a location higher than the lower platter section 170. The vertical displacement forms a multi-plane platter embodiment as in the All-Weighs® platter available from Datalogic ADC, Inc. of Eugene, Oreg., or as described in U.S. Pat. No. RE 40,071. Accordingly, in some embodiments, the platter 144 provides a weigh-scale scale surface for the data reader 100 operating as a scale. Also, the aforementioned components of the data reader 100 are mounted (directly or indirectly) to a common base, housing, or chassis 180 in a checkstand lane or counter 184. In some embodiments, the platter 144 may comprise a structure that is readily removable from the chassis 180.

FIG. 1 also shows the data reader 100 with internal imagers 192, 194, and 196 for acquiring images via each of the respective windows 164, 165L, 165R, and 168. The three imagers 192, 194, and 196 have associated optics (mirrors and lenses) to provide multiple perspectives for reading optical codes on the top side 150, the bottom side 152, the leading side 154, the trailing side 156, the customer side 160, and—depending on the view angle projected out via the horizontal platter window 164—the checker side 158. For example, the imager 196 of the top-down reader 167 produces a field of view 197 (or so-called read volume) outward and through the window 168. The read volume 197 is an undivided perspective encompassing a centrally located portion of the lower platter section 170, and spanning across the surface area of the horizontal platter window 164 to ensure that optical codes located on the top side 150 can be read by the imager 196 as the object 120 passes through a read volume 198. Imagers 192 and 194 also each simultaneously produce separate read volumes 198 to attempt to locate optical codes on various sides of the object 120 in order to minimize the possibility of a missed read. In other embodiments, a single imager and associated mirrors or optics may establish multiple read volumes for the imager.

A read zone may be formed from one or more partially overlapping read volumes, as is defined by one or more imaging devices, so as to read one or more sides of the object 120. For example, in both laser-based and imager-based types of readers, dual-plane or bi-optic style readers have horizontally and vertically oriented imaging devices producing overlapping read volumes. Dual-plane or bi-optic style readers are popular for high-volume applications because they provide multiple overlapping perspectives (or fields of view) that establish a larger read zone, and they provide simultaneous views of several sides of an object. In FIG. 1, a read zone 199 encompasses the read volumes 197 and 198 and is generally indicated by a surface texture design on the platter 144.

The data reader 100 may comprise an in-counter sweep data reader, such as a Magellan® 9300i, 9400i, or 9800i, all of which are available from Datalogic ADC, Inc. of Eugene, Oreg. According to another embodiment, the data reader 100 may comprise a presentation data reader, such as a Magellan® 3200i, which is also available from Datalogic ADC, Inc. A presentation data reader, however, is typically used in an on-counter configuration, in which case a user ordinarily would not rapidly sweep an object through the read zone of the presentation data reader.

Figure 2:
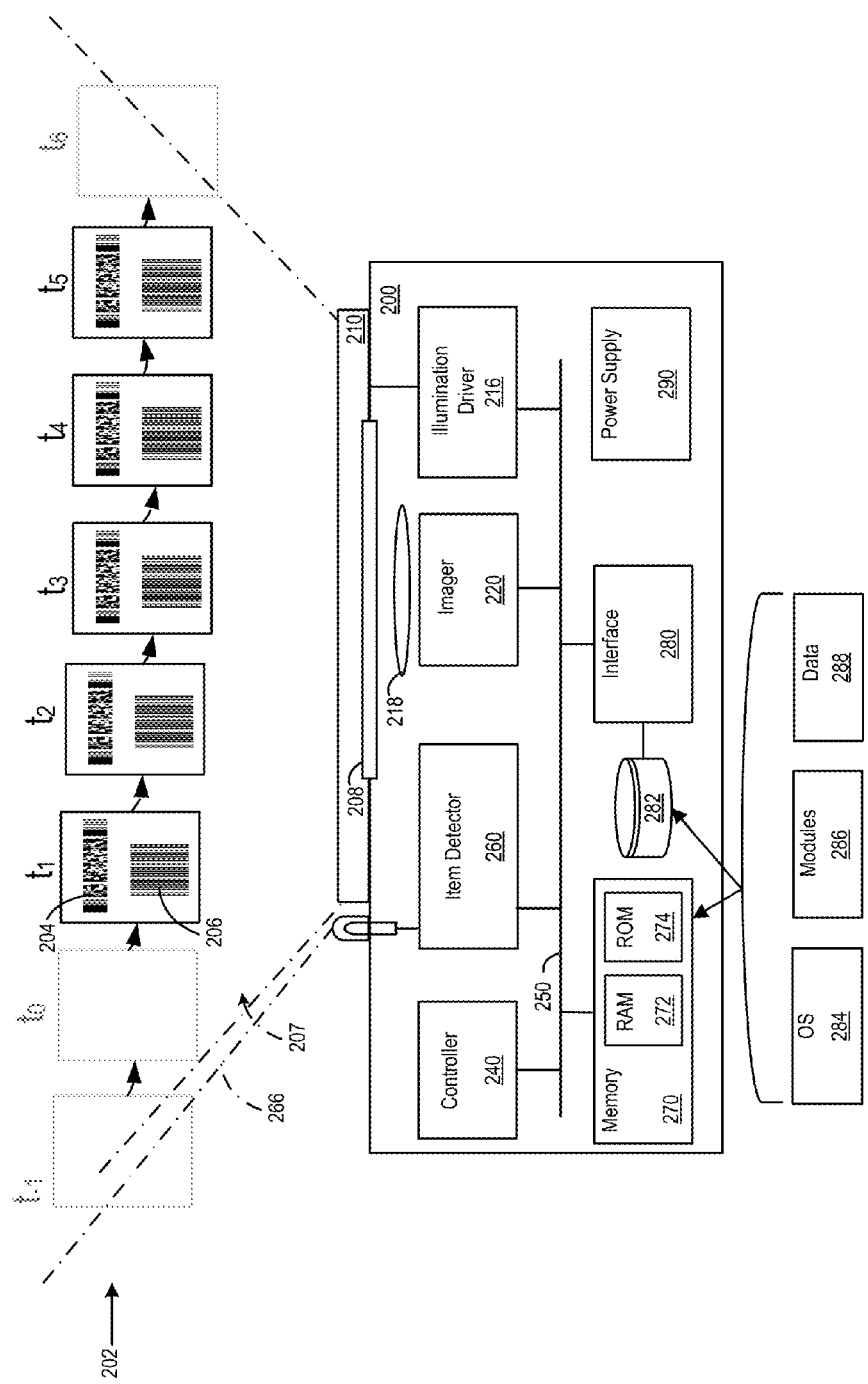
FIG. 2 is a block diagram of a data reader, shown capturing several image frames of an optical code borne by an object passing through a read zone.

FIG. 2 is a block diagram of a data reader 200 that, according to another embodiment, is configured to capture frames of image data of an object 202 for reading an optical code, such as a stacked linear barcode 204 (PDF417), one-dimensional linear barcode 206 (Code 128 or UPC/EAN), or other optical code symbologies. The data reader 200 may be any data reader capable of reading an optical code as an object bearing the optical code is swept through a read zone 207 (close to a window 208).

The data reader 200 includes an illumination source 210. The illumination source 210 may comprise any suitable source of light, such as LEDs, flash strobes, incandescent or fluorescent lamps, or halogen bulbs. According to one embodiment, the illumination source 210 comprises one or more light emitting diodes (LEDs).

An illumination driver or controller 216 is optionally provided. The illumination driver 216 is configured to apply signals to the illumination source 210. According to one embodiment, the illumination driver 216 drives the illumination source 210 with a series of illumination pulses having a given pulse width. In general, increasing the pulse width increases the perceived intensity of illumination by increasing the percentage of time in which the illumination source 210 is on during the illumination pulse cycle (i.e., by increasing the duty cycle of the illumination waveform).

A lens assembly 218 comprising one or more lenses may be used for focusing light onto an imager 220. For example, the lens assembly 218 may comprise a single optical element or may comprise an array of optical elements with a common axis. A lens assembly may also comprise a zoom lens controlled by a controller 240.

The imager 220 may comprise a wide range of image-sensing devices for converting an optical image of various wavelengths into an electrical signal. The image may be a visible image composed of wavelengths in the range of approximately 380 nm to 750 nm or it may contain or be composed primarily of wavelengths of the electromagnetic spectrum that are outside the visible range (e.g., infrared light). For example, the imager 220 may be a charge-coupled device (CCD) or complementary metal-oxide semiconductor (CMOS) imager, both of which form a one-dimensional or two-dimensional array of pixels, which together constitute an electronic representation of the image.

Each pixel location provides data indicative of the light intensity at that location of the image. The light intensity data for each pixel may represent a color (e.g., red-green-blue) or monochrome intensity (e.g., grayscale). One suitable imager is the model EV76C560 CMOS sensor offered by e2v Technologies PLC, Essex, England, for example. Another suitable imager is the model MT9V022 sensor sold by Micron Technology, Inc. of Boise, Id. For convenience, the data reader 200 will be described with reference to the imager 220 and the illumination source 210, but it should be understood that other suitable sensor devices or light sources may be employed.

The imager 220 and the illumination driver 216 connect to the controller 240, which may be, for example, a processor, microprocessor, controller, microcontroller, or the like. The connection may be via a bus 250 or other communication mechanism, such as direct connections of a serial, parallel, or other type. The controller 240 generally controls and coordinates the operation of other devices to which it is connected, such as one or more of the imager 220, the illumination driver 216, and an item detector 260.

Examples of the item detector 260 include an infrared (IR) detector to identify when an object blocks or otherwise reflects an IR beam 266, other types of optical eyes, or machine-vision-based item detectors implemented by detecting changes present in image data between sampled image frames. For example, the imager 220 itself may comprise an item detector, in which case the imager 220 may detect an item is present in response to histogram data (e.g., from sub-sampled image data read out with IR illumination) being above a threshold, such as 5% of pixels having a highest grey scale value that is greater than certain threshold. Upon detection, the imager 220 switches to a nominal, detected-object image capture mode (non-sub-sample), using red-colored illumination to read a barcode from the detected item. In short, the item detector 260 detects the object 202 entering the read zone 207, which causes the data reader 200 to enter the detected-object mode. This mode triggers an image-capture sequence to capture a series of image frames.

After the imager 220 has been exposed to light reflected by the object 202, the imager 220 forms an electronic image data in which data from all or a portion of the pixels can be sequentially read out, e.g., by direct memory access (DMA), in a selectable pattern (which may be row-by-row, column-by-column, or some other pattern). In some embodiments, pixel intensity data may optionally be converted to digital form using an analog-to-digital converter circuit.

Image data is provided to a digital signal processor (DSP) or other decoder processing device interfaced to the imager 220 in such a way as to read image data from the imager 220. An example decoder processing device may be, for example, a true DSP architecture, such as the Blackfin® processor family from Analog Devices, Norwood, Mass., or a microcontroller, such as the high speed ARM® processor family from ARM Ltd., Cambridge, United Kingdom.

The decoder processing device processes the image data so as to attempt to decode a readable barcode image that has been focused onto the imager 220. In doing so, the decoder processing device may condition the image data received from the imager 220 and may generate an output that generally identifies which regions of the image correspond to light areas, and which correspond to dark areas. For example, a DSP may set the thresholding so that the bars or relatively darker modules of the barcode symbology (or other target) are reported as being dark, and the spaces or relatively lighter regions between the bars or darker regions are reported as being light, according to any of a number of techniques. According to one embodiment, the imager 220 and a DSP or a decoder processing device may be contained in a common integrated circuit.

According to another embodiment, DSP functionality may be implemented by the controller 240 or one or more other logic machines capable of executing instructions. The controller 240 may also perform or facilitate other functions, such as recording frames of imager data for later analysis or testing. For example, as described later with reference to FIG. 3, the controller 240 or other processing device marks frames with metadata marks so that the frames may be prioritized according to methods shown and described in connection with FIGS. 4-6.

The data reader 200 also includes memory 270, which may include non-transitory program and frame buffer memory. Non-transitory memory storage devices may include, for instance, RAM 272, ROM 274, and EEPROM devices, and may also include magnetic or optical storage devices, such as hard disk drives, flash memory, CD-ROM drives, and DVD-ROM drives. The data reader 200 may also include an interface 280 coupled to an internal memory, such as a hard disk drive 282. In addition, or alternatively, the interface 280 may be coupled to flash memory, a magnetic floppy disk drive, an optical disk drive, or another memory or drive and may be configured for external drive implementations, such as over a USB, IEEE 1194, or ExpressCard connection.

According to one embodiment, any number of program modules are stored in the drives (e.g., the drive 282) and ROM 274, including an operating system (OS) 284, one or more application programs or modules 286, such as instructions to implement the methods described herein, and data 288. All or portions of the program modules may also be cached in RAM 272.

Any suitable operating system 284 may be employed. One of the program modules 286 may comprise a set of instructions to implement the methods for allocating resources, as described herein.

The data 288 may include one or more configuration settings or parameters, such as the setting controlling the desired number of sweep frames to obtain before obtaining presentation, or other settings. The data 288 may also include image data from the imager 220 and decoded optical code data.

The data reader 200 also includes one or more power supplies 290, which provide electrical power to the various components of the data reader 200 via power connections.

The data reader 200 may include a number of other components that interface with one another via the bus 250, including a display controller and display device, an input controller, and a network interface. The display controller and display device may be provided to present data, menus, and prompts, and otherwise communicate with the user via one or more display devices, such as a transmissive or reflective liquid crystal display (LCD), cathode ray tube (CRT) display, or other suitable display. For example, as will be described in more detail below, the display controller and display device may be configured to display a navigable menu system or graphical user interface (GUI) that allows the user to select the illumination setting or settings.

The input controller may be configured to receive user input from one or more input devices, such as a keyboard, a pointing device, or other wired/wireless input devices, that allow the user to, for example, select the illumination setting or settings or otherwise configure the data reader 200. Other input devices may be included, such as a microphone, touchscreen, touchpad, and trackball. While the input devices may be integrated into the data reader 200 and coupled to the processor 240 via the input controller, input devices may also connect via other interfaces, such as a connector that includes one or more data interfaces, bus interfaces, wired or wireless network adapters, or modems for transmitting and receiving data. Accordingly, the input controller may include one or more of hardware, software, and firmware to implement one or more protocols, such as stacked protocols along with corresponding layers. Thus, the connector may function as one or more of a serial port (e.g., RS232), a Universal Serial Bus (USB) port, and an IR interface. The input controller may also support various wired, wireless, optical, and other communication standards.

The network interface may optionally be provided to communicate with one or more hosts or other devices (e.g., a computer, a point-of-sale terminal, a point-of-sale computer system, or a cash register). For example, data gathered by or decoded by the data reader 200 may be passed along to a host computer. The network interface may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (ExpressCard), and USB. A wireless connection may use low- or high-powered electromagnetic waves to transmit data using any wireless protocol, such as Bluetooth™, IEEE 802.11a/b/g/n (or other Wi-Fi standards), infrared data association (IrDa), and radiofrequency identification (RFID).

Figures 3, 4:
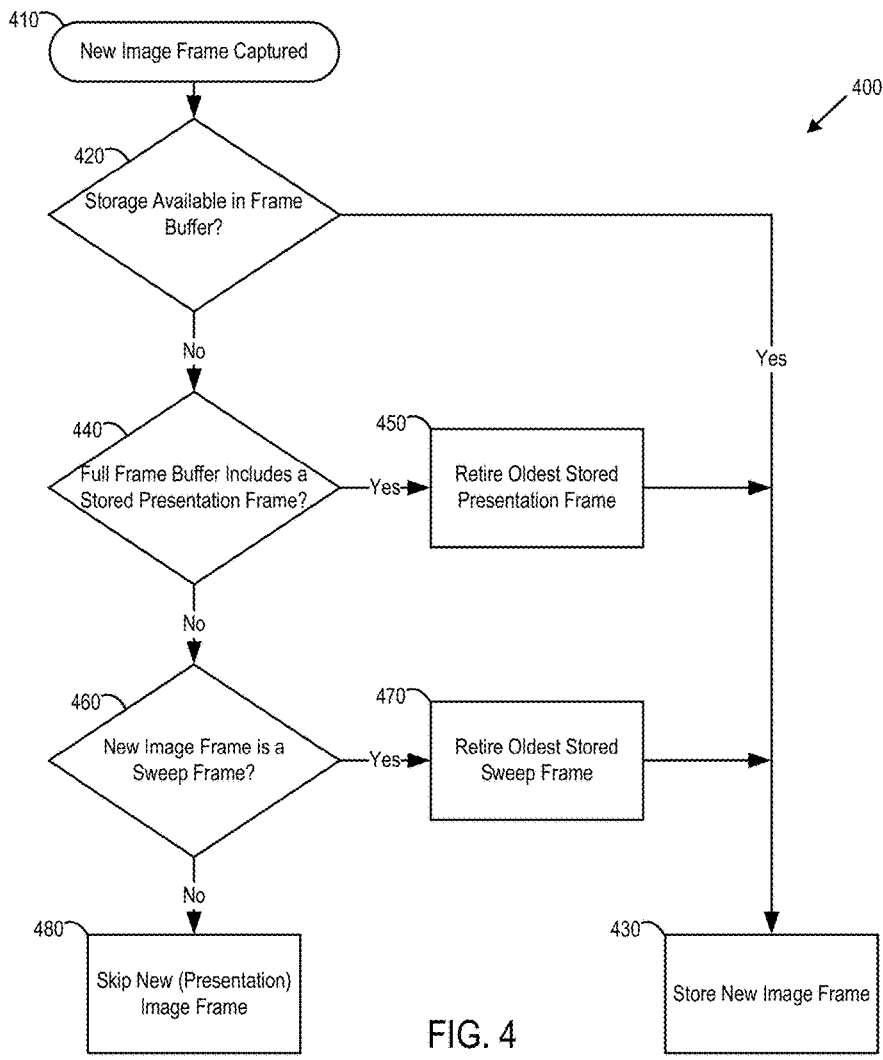
FIG. 3 is a table showing metadata (or so-called marks) associated with five image frames stored in corresponding frame buffer memory sites (e.g., stored in five separate buffers or five corresponding locations in common memory).
FIG. 4 is a flow chart of a method, e.g., performed by the in-counter sweep-style data reader of FIG. 1, of increasing a likelihood of decoding an optical code appearing in initial image frames by managing utilization of frame buffer memory according to a prioritization of different categories of image frames captured as an object bearing an optical code is passed through the read zone.

FIG. 3 is a table 300 showing metadata associated with five image buffers A-E. These five buffers may be several discrete memory devices, or they may be five locations in a single memory device. For that reason, "buffer" may refer generically to a single buffer (e.g., when referring to storing an image frame in a buffer location of memory or in one of several discrete storage devices) and it may also refer to a collection of several storage locations (e.g., when referring to the buffer being full, as in all locations have stored frames).

The buffers A-E are full with image frame nos. 4-8. Image frames nos. 4 and 5 are categorized as sweep frames (Type 1), whereas image frame nos. 6-8 are presentation frames (Type 2). Image frame no. 4 has also undergone decoding, but no code was obtained because other image frames are being decoded or awaiting to be decoded. Accordingly, a decoder processing device is currently attempting to decode image frame no. 5 while image frame nos. 6-8 will be decoded when decoder processing time is available. The metadata marks also include an indication of the overall darkness of each image frame, which is helpful in assessing whether the image frame is likely to have decodable data. For example, a relatively dark image frame no. 4 has a fifth-percentile of its pixels at grey level of 110 or lighter, which indicates this image is likely to have an object. In contrast, a fifth-percentile of 30 would indicate the image has few light-colored pixels and therefore is unlikely to have decodable data. (These thresholds may be configurable.) This additional grey-level data may also be used to allocate more or less resources to a given image frame. According to one embodiment, images that are too dark are immediately discarded so that newer frames can be stored at their locations in frame buffer memory.

FIG. 4 is a flow chart of a method 400, which may be performed by an in-counter sweep-style data reader having frame buffer memory and an imager defining a read zone, of increasing a likelihood of decoding an optical code appearing in initial image frames by managing utilization of the frame buffer memory according to a prioritization of different categories of image frames captured by the imager as an object bearing an optical code is passed through the read zone.

Initially, the method 400 may entail defining first and second categories of image frames, as explained with reference to FIG. 3. As noted previously, the first category of image frames corresponds to sweep frames having a first (i.e., higher) priority and the second category of image frames corresponds to presentation frames having a second (i.e., lower) priority.

With the priorities established, the method 400 includes detecting the object entering a read zone so as to capture 410 new image frames. Item detection is achieved, for example, by using the item detector 260 (FIG. 2).

In response to detecting an object in the read zone, a predefined (i.e., configurable) number of sweep frames are captured, which are followed by capturing one or more presentation frames. In other words, the new frames that are captured 410 correspond to the sequence of images shown in FIG. 2 from times $t_1$ to $t_6$.

Captured image frames are then maintained in the frame buffer memory based on priorities and storage times of stored frames. For example, higher priority frames may replace lower priority frames, and newer frames may replace older frames. Priority may be determined based on when or how the frame was obtained, e.g., initially or subsequently, during a sweep. Storage times may be determined based on a time stamp, frame sequence or serial number, or any other relative or actual timing information that may be used to ascertain an age of frame. Accordingly, in response to determining whether frame buffer memory is full, a newest sweep frame replaces a stored frame of either the first or second categories and a newest presentation frame is skipped when the stored frames are of the first category.

Specifically, FIG. 4 shows that, in response to determining 420 that storage is available, a new image frame is always stored 430 in the available space. But if the buffer is full, then the method 400 determines 440 whether there are older stored presentation frames that could be replaced. For example, if the new frame is a presentation frame, then it replaces 450 an oldest presentation frame in the buffer. Replacing simply means that the new frame overwrites the old, retired frame, which may be unprocessed or may be undergoing processing. In some other embodiments, replacing means deleting the old frame or otherwise making it unavailable for (further) decoding, so as to use its storage space for the new frame.

Similarly, if the buffer is full and it is determined 460 that the new frame is a sweep frame, then the sweep frame replaces 450, 470 the oldest frame, irrespective of whether the oldest frame happens to be a sweep frame or a presentation frame. In other words, new sweep frames are treated with a higher priority than old frames. In other embodiments, new sweep frames may replace old presentation frames, but might not replace older sweep frames.

Finally, if the new frame is a presentation frame and the buffer is full of only sweep frames of higher priority than that of presentation frames, then the new presentation frame is discarded or otherwise skipped 480. Accordingly, any stored sweep frames are treated as having a higher priority to that of the new presentation frame.

Skilled persons will recognize that the aforementioned determinations and other such comparisons or decisions noted in connection with the method 400 of FIG. 4 can be readily made with reference to metadata marks available in program memory, or other operating memory, as previously shown and described in connection with FIG. 3. Also, the order of the aforementioned determinations and other such processing techniques may be performed in different orders. For example, in another embodiment, a method may entail first determining whether the new frame is a presentation frame or a sweep frame. If the new frame is a sweep frame and no buffer space is available, then it replaces a stored presentation frame. But if no presentation frame is stored and only sweep frames are stored, then the new frame replaces the oldest sweep frame. And if the new frame is a presentation frame, then it replaces the oldest presentation frame or is otherwise skipped.

Figure 5:
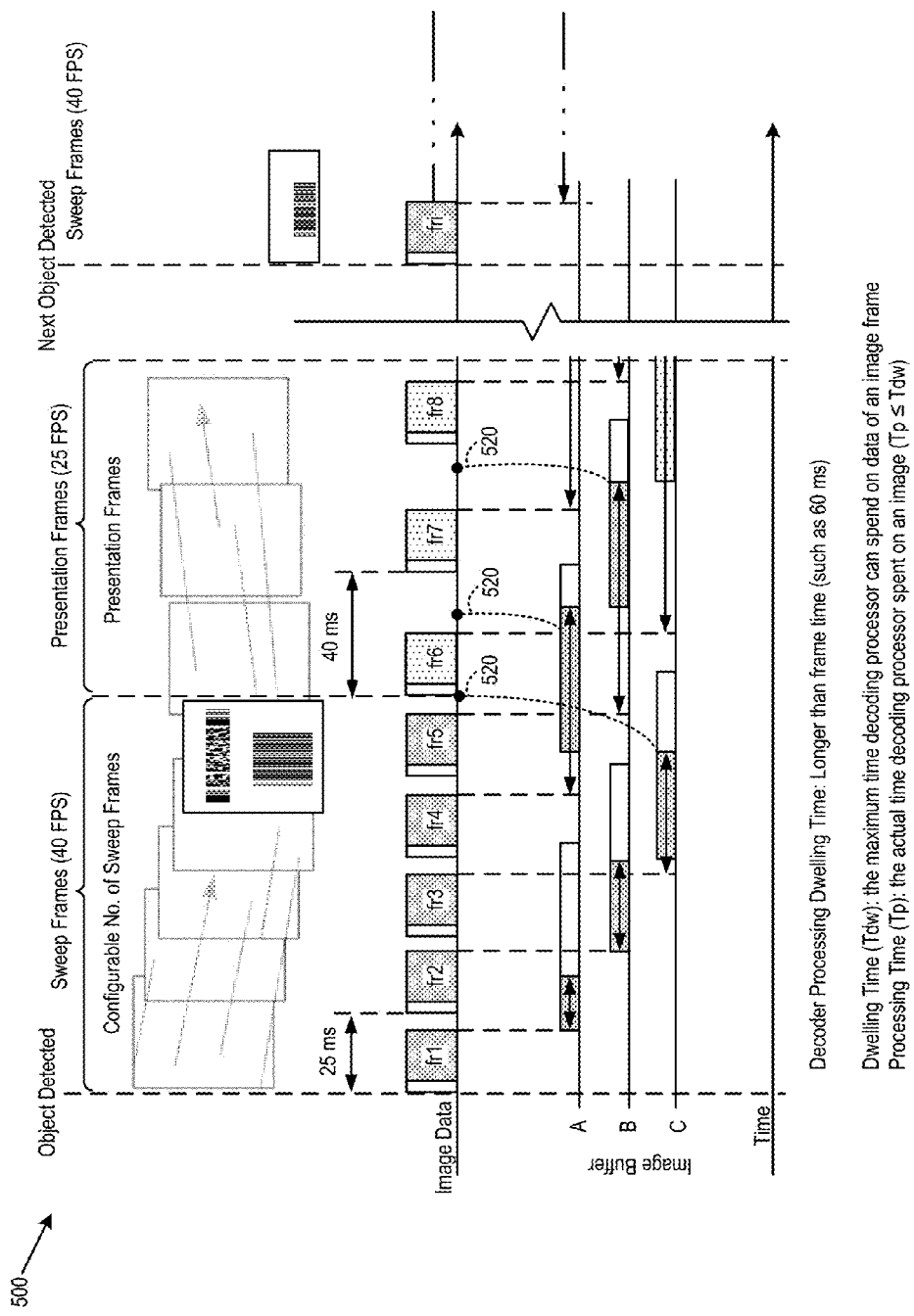
FIGS. 5 and 6 are annotated timing diagrams showing two examples of adjusting timing parameters between different categories of image frames, in which the examples of FIGS. 5 and 6 show decreases in, respectively, frame rate and decoder processing dwelling time.
Figure 6:
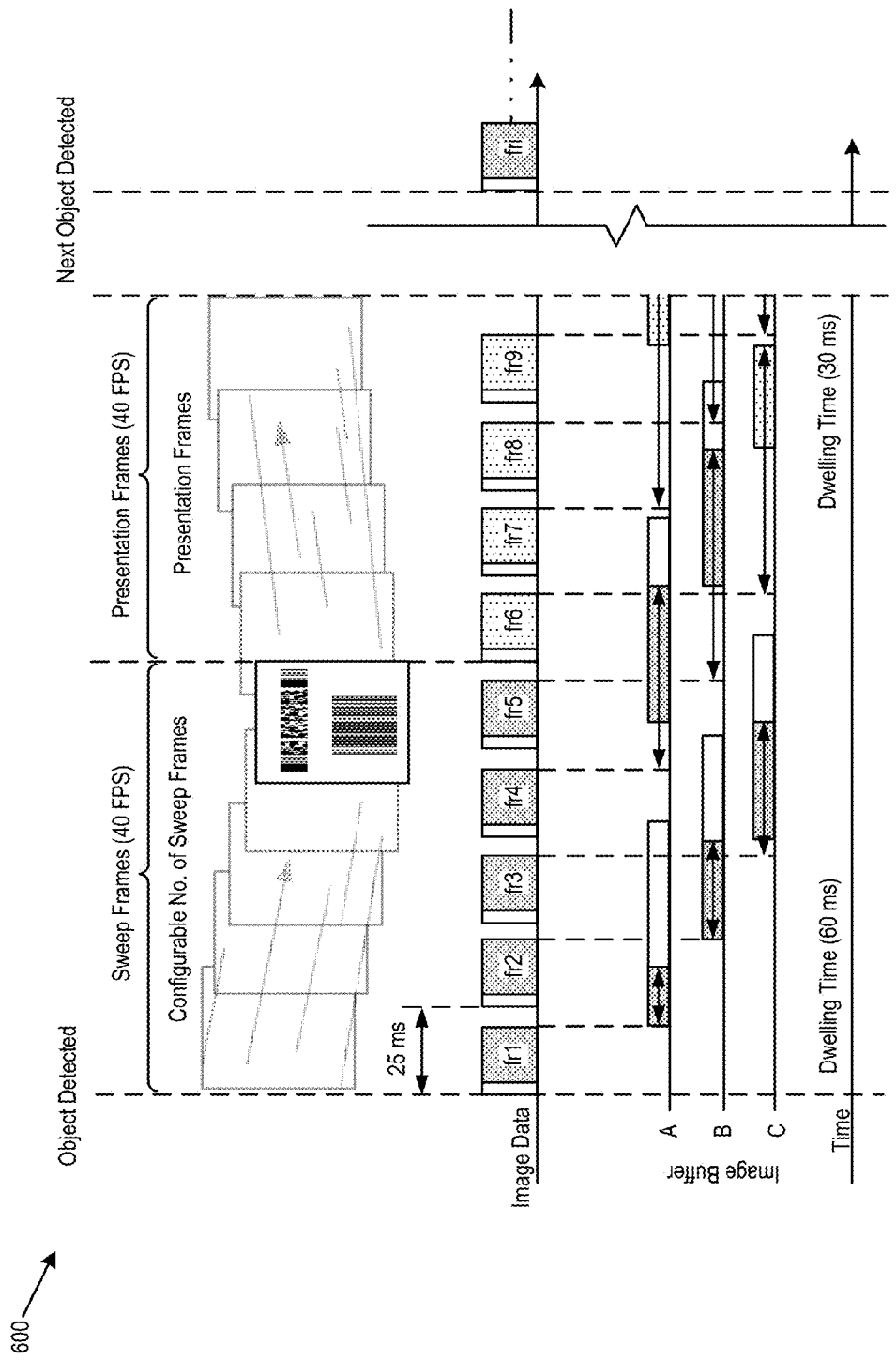

FIGS. 5 and 6 show examples of allocating more resources to sweep frames compared resources allocated to presentation frames. For example, a desired resource allocation is achieved by establishing a first timing parameter for the predefined number of sweep frames, such that the first timing parameter includes at least one of a first frame rate or a first decoder processing dwelling time. A second timing parameter is also established for the one or more presentation frames, such that the second timing parameter includes at least one of a second frame rate or a second decoder processing dwelling time and such that the second timing parameter is less (e.g., slower frame rate or shorter dwelling time) than the first timing parameter. The data reader is configured to change from the first timing parameter to the second timing parameter so as to increase a likelihood that the frame buffer memory is available for a newest presentation frame.

With reference to FIG. 5, for example, a timing diagram 500 shows how a reduction in a frame rate used when acquiring presentation frames reduces the likelihood of overflowing frame buffer memory (buffers A-C). In other words, an initial five sweep frames are first obtained using a first frame rate and the subsequent presentation frames are obtained using a second frame rate that is slower than the first frame rate. In the example, the first frame rate is 40 frames-per-second (FPS) and the second frame rate is 25 FPS. These frame rates are just examples; other frame rates may be used.

In the example timeline 500, a data reader is preconfigured to obtain five sweep frames, although some other examples may configure a different predefined number of sweep frames to obtain following an item-detection event. And after obtaining these initial frames, the data reader may continue to obtain a variable number of presentation frames until an optical code is decoded or an object is no longer detected in the read zone.

The timeline 500 shows three frame buffer memory resources, which are used to store frames as they undergo processing or await to be processed by a decoder processing device. These buffers store image data from each of frames fr1-fr8. These frames fr1-fr8 are shown temporally as including some exposure time (e.g., about 100 microseconds) represented by a white rectangle, followed by a DMA-transfer time during which image data is obtained from an imager, and then followed by a brief gap until the next frame exposure event. For sweep frames at 40 FPS, the exposure, DMA-transfer, and gap time are about 25 milliseconds (ms), whereas presentation frames have a longer gap resulting in 40 ms between frames.

Once data is DMA-transferred to an available buffer A, B, or C, it is stored there until the decoder processing device is available to attempt to decode the data. In the example of FIG. 5, the decoder processing device allocates each frame up to 60 ms, which is called decoder processing dwelling time, or simply dwelling time. Dwelling time is the maximum amount of time that the processor will attempt to read. In contrast, processing time is the actual time that the processer spends attempting to read. Processing time is always less than or equal to dwelling time because the decoder processing device may readily recognize that some stored image data cannot be decoded. In other words, localization (e.g., finding features of an optical code, such as right guide, left guide, center guide; start and stop) may indicate no optical code exists in the image. Similarly, depending on the image quality, the decoding process may return a result quickly. Accordingly, FIG. 5 represents dwelling time as a white rectangular region spanning 60 ms, whereas processing time is a shaded region spanning from the beginning of the dwelling time to a point at which processing concludes. Buffer utilization time is also shown by timeline arrows spanning between a time at which image data is DMA-transferred to a particular buffer until a time at which the processing time concludes for that particular buffer.

Although FIG. 5 shows a change between two static frame rates, it also shows that the frame rate of the presentation frames may be a variable (dynamically controlled) frame rate. For example, dashed lines 520 show that, once a buffer is available, that event may be signaled so that a new presentation frame may be acquired in response to the buffer becoming available. Because buffer availability depends on processing time, this has the effect of varying the frame rate for presentation frames. Also, because dwelling time is capped at 60 ms in some embodiments, a data reader can predict when a buffer will be made available. Such a prediction is shown in image buffer A as it is being used for processing frame fr4. As shown, that frame fr4 is undergoing processing, but a signal (such as an interrupt) is provided in advance of the processing being completed, since the expiration of the dwelling time (i.e., the next availability of the buffer A) will occur at a known time.

FIG. 6 shows an example timing diagram 600 that is similar to that of FIG. 5. The example timeline 600 of FIG. 6, however, shows a change in dwelling time rather than a change in frame rate. Accordingly, both the sweep and presentation frames are obtained using a 40 FPS frame rate. But the 30 ms dwelling time for each of the presentation frames is half of the 60 ms dwelling time for each of the sweep frames.

Skilled persons will understand that many changes may be made to the details of the above-described embodiments without departing from the underlying principles of the invention. The scope of the present invention should, therefore, be determined only by the following claims.

The invention claimed is:

1. A method, performed by a data reader having frame buffer memory and an imager defining a read zone, of controlling image frames captured as an object bearing an optical code is passed through the read zone, the method comprising:
    selecting a predefined number of sweep frames;
    detecting the object entering the read zone;
    in response to detecting the object, capturing the predefined number of sweep frames followed by one or more presentation frames, the sweep frames defining a first category of image frames having a first priority and the one or more presentation frames defining a second category of image frames having a second priority that is lower than the first priority;
    storing captured image frames in the frame buffer memory based on priorities and storage times of stored frames such that, in response to the frame buffer memory being full, a newest sweep frame replaces a stored frame of either the first or second categories and a newest presentation frame is skipped when the stored frames are of the first category;
    establishing a first timing parameter for the predefined number of sweep frames, the first timing parameter including at least one of a first frame rate or a first decoder processing dwelling time;
    establishing a second timing parameter for the one or more presentation frames, the second timing parameter being less than the first timing parameter, the second timing parameter including at least one of a second frame rate or a second decoder processing dwelling time; and
    changing from the first timing parameter to the second timing parameter so as to increase a likelihood that the frame buffer memory is available for the newest presentation frame.

2. The method of claim 1, in which the storing further comprises:
    determining whether the stored frame is a stored presentation frame of the second category; and
    in response to determining that the stored frame is of the second category, overwriting data of the stored frame with data of the newest presentation frame.

3. The method of claim 1, in which the storing further comprises:
    determining that the frame buffer memory is full and that the stored frames are each of the first category; and
    in response to the determining, replacing an oldest stored frame with the newest sweep frame.

4. The method of claim 1, in which the storing further comprises:
    determining that the frame buffer memory is full and that the stored frames include one or more stored presentation frames; and
    in response to the determining, replacing a stored presentation frame with the newest presentation frame.

5. The method of claim 4, further comprising:
    determining from among the one or more stored presentation frames an oldest stored presentation frame; and
    replacing the oldest stored presentation frame with the newest presentation frame.

6. The method of claim 1 in which the first timing parameter is the first frame rate and the second timing parameter is the second frame rate, the second frame rate being less than the first frame rate.

7. The method of claim 6, further comprising dynamically controlling the second frame rate based on a decoder processing time.

8. The method of claim 1 in which the first timing parameter is the first decoder processing dwelling time and the second timing parameter is the second decoder processing dwelling time, the second decoder processing dwelling time being less than the first decoder processing dwelling time.

9. A non-transitory machine-readable storage device of a data reader having frame buffer memory, a processor, and an imager defining a read zone, the storage device having instructions stored thereon for control of image frames captured as an object bearing an optical code is passed through the read zone, the instructions, when performed by the processor, cause the data reader to:
    select a predefined number of sweep frames;
    detect the object entering the read zone;
    in response to detecting the object, capture the predefined number of sweep frames followed by one or more presentation frames, the sweep frames defining a first category of image frames having a first priority and the one or more presentation frames defining a second category of image frames having a second priority that is lower than the first priority;

store captured image frames in the frame buffer memory based on priorities and storage times of stored frames such that, in response to the frame buffer memory being full, a newest sweep frame replaces a stored frame of either the first or second categories and a newest presentation frame is skipped when the stored frames are of the first category;

establish a first timing parameter for the predefined number of sweep frames, the first timing parameter including at least one of a first frame rate or a first decoder processing dwelling time;

establish a second timing parameter for the one or more presentation frames, the second timing parameter being less than the first timing parameter, the second timing parameter including at least one of a second frame rate or a second decoder processing dwelling time; and change from the first timing parameter to the second timing parameter so as to increase a likelihood that the frame buffer memory is available for the newest presentation frame.

10. The non-transitory machine-readable storage device of claim 9, in which the instructions further cause the processor to:
    determine whether the stored frame is a stored presentation frame of the second category; and
    in response to determining that the stored frame is of the second category, initiating an overwriting of data of the stored frame with data of the newest presentation frame.

11. The non-transitory machine-readable storage device of claim 9, in which the instructions further cause the processor to:
    determine that the frame buffer memory is full and that the stored frames are each of the first category; and
    in response to the determining, replace an oldest stored frame with the newest sweep frame.

12. The non-transitory machine-readable storage device of claim 9, in which the instructions further cause the processor to:
    determine that the frame buffer memory is full and that the stored frames include one or more stored presentation frames; and
    in response to the determining, replace a stored presentation frame with the newest presentation frame.

13. The non-transitory machine-readable storage device of claim 12, in which the instructions further cause the processor to:
    determine from among the one or more stored presentation frames an oldest stored presentation frame; and
    replace the oldest stored presentation frame with the newest presentation frame.

14. The non-transitory machine-readable storage device of claim 9, in which the first timing parameter is the first frame rate and the second timing parameter is the second frame rate, the second frame rate being less than the first frame rate.

15. The non-transitory machine-readable storage device of claim 14, in which the instructions further cause the processor to dynamically control the second frame rate based on a decoder processing time.

16. The non-transitory machine-readable storage device of claim 9, in which the first timing parameter is the first decoder processing dwelling time and the second timing parameter is the second decoder processing dwelling time, the second decoder processing dwelling time being less than the first decoder processing dwelling time.

* * * * *